United States Patent
Warkentin et al.

(10) Patent No.: US 12,436,789 B2
(45) Date of Patent: Oct. 7, 2025

(54) LOADING MANAGEMENT HYPERVISORS FROM A SYSTEM CONTROL PROCESSOR

(71) Applicant: VMware LLC, Palo Alto, CA (US)

(72) Inventors: Andrei Warkentin, South Elgin, IL (US); Sunil Kotian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 604 days.

(21) Appl. No.: 17/716,087

(22) Filed: Apr. 8, 2022

(65) Prior Publication Data

US 2023/0325224 A1  Oct. 12, 2023

(51) Int. Cl.
  *G06F 9/455*  (2018.01)
  *G06F 9/4401*  (2018.01)

(52) U.S. Cl.
  CPC ........ *G06F 9/45558* (2013.01); *G06F 9/4401* (2013.01); *G06F 9/45545* (2013.01); *G06F 2009/45575* (2013.01); *G06F 2009/45583* (2013.01)

(58) Field of Classification Search
  None
  See application file for complete search history.

(56) References Cited

U.S. PATENT DOCUMENTS

| | | | |
|---|---|---|---|
| 8,799,429 B1 * | 8/2014 | Chatterjee | H04L 67/1097 709/222 |
| 10,114,653 B2 * | 10/2018 | Bower, III | G06F 9/4411 |
| 2021/0026647 A1 * | 1/2021 | Warkentin | G06F 9/4401 |
| 2021/0026648 A1 * | 1/2021 | Warkentin | G06F 9/4401 |

OTHER PUBLICATIONS

LNXBlog; Understanding ARM Trusted Firmware using QEMU, lnxblog.github.io/2020/08/20/qemu-arm-tf.html; Aug. 20, 2020 (Year: 2020).*

* cited by examiner

*Primary Examiner* — Bing Zhao
(74) *Attorney, Agent, or Firm* — King Intellectual Asset Management

(57) ABSTRACT

Disclosed are various examples of loading management hypervisors from a system control processor. In some examples, a host device executes a first stage bootloader of a management hypervisor from a system control processor. The first stage bootloader loads management hypervisor data and firmware instructions into a main processor memory of a main processor, and initializes the main processor to execute the firmware instructions. The system then jumps to a second stage bootloader that configures and launches the management hypervisor using the management hypervisor data.

20 Claims, 4 Drawing Sheets

LOADING MANAGEMENT HYPERVISORS FROM A SYSTEM CONTROL PROCESSOR

BACKGROUND

Enterprises can employ a management service that uses virtualization to provide the enterprise with access to software, data, and other resources. The management service use host devices to execute workloads that provide software services for enterprise activities. The enterprises can use other host devices to access these workloads Booting management hypervisors in traditional systems can impose a number of requirements on the system firmware. For example, Unified Extensible Firmware Interface (UEFI) firmware can use drivers for video, console, storage, network for a preboot execution environment (PXE) or other uses, and so on. These drivers can require significant investment on the side of the platform integrator, enterprises, and management services, and device providers. As a result, UEFI-based solutions can be difficult or costly to implement. Some devices can lack UEFI, or can lack a UEFI that includes drivers for all device hardware used by the management hypervisor. However, the present disclosure describes mechanisms that can execute a first stage bootloader of a management hypervisor as a Linux or POSIX-like user-space application, rather than a kernel space or other privileged mode driver or application. The first stage bootloader can use block, filesystem, network, console, and I/O facilities and system calls to a preinstalled operating system to build the boot data handoff structures including memory maps and hardware identification and descriptions for hardware resources of a host device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure describes implementations of loading a management hypervisor from a system control processor (SCP). Booting management hypervisors in traditional systems can impose a number of requirements on the system firmware. Unified Extensible Firmware Interface (UEFI) firmware can use drivers for video, console, storage, network for a preboot execution environment (PXE) or other uses, and so on. The driver requirements can cause significant investment on the side of the platform integrator, enterprises, and management services, and device providers. As a result, UEFI-based solutions can be difficult or costly to implement. Some devices can lack firmware capable of installing the management hypervisor. For example, the devices can lack UEFI, or can lack a UEFI that includes drivers for host device hardware.

However, the present disclosure describes mechanisms that can execute a first stage bootloader of a management hypervisor from a system control processor (SCP). The SCP can execute an operating system that provides a user space environment for the first stage bootloader, rather than executing the first stage bootloader as a privileged driver or privileged application that operates in an exception level, ring, or other privilege higher than user space. The first stage bootloader can use block, filesystem, network, console, and I/O facilities and system calls to the SCP operating system to build the boot data handoff structures including memory maps and hardware identification and descriptions for host hardware resources.

Figure 1:
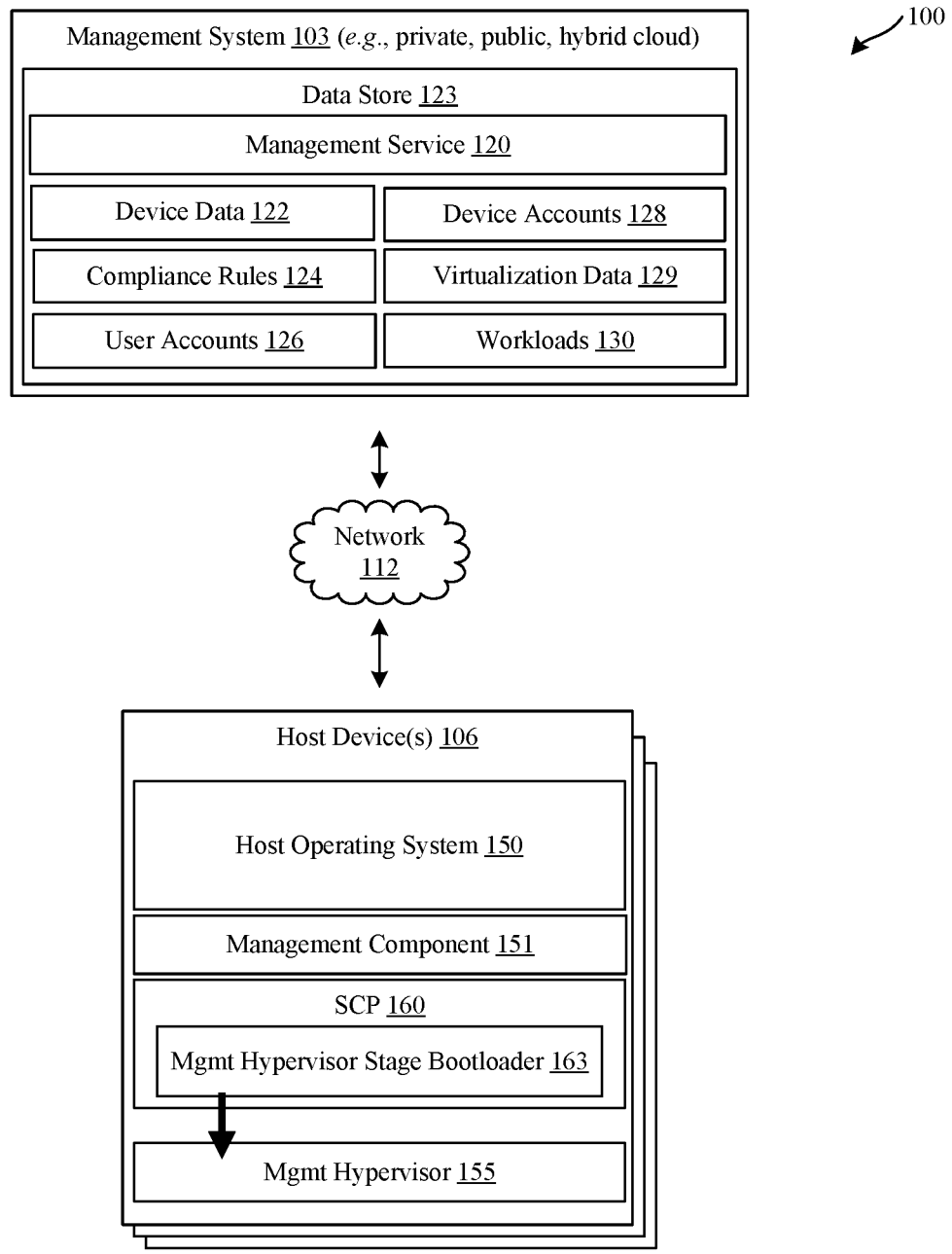
FIG. 1 is a drawing of an example of a networked environment that includes components that load a management hypervisor from a system control processor (SCP), according to the present disclosure.

With reference to FIG. 1, shown is an example of a networked environment 100. The networked environment 100 can include a management system 103, host devices 106, and other components in communication with one another over a network 112. In some cases, host devices 106 can include computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The host devices 106 can also include devices that can connect to the network 112 directly or through an edge device or gateway. The components of the networked environment 100 can be utilized to provide virtualization solutions for an enterprise. The hardware of the host devices 106 can include physical memory, physical processors, physical data storage, and physical network resources that can be utilized by virtual machines. Host devices 106 can also include peripheral components such as the host devices 106. The host devices 106 can include physical memory, physical processors, physical data storage, and physical network resources. Virtual memory, virtual processors, virtual data storage, and virtual network resources of a virtual machine can be mapped to physical memory, physical processors, physical data storage, and physical network resources of the host devices 106. The management hypervisor 155 can provide access to the physical memory, physical processors, physical data storage, and physical network resources of the host devices 106 to perform workloads 130.

A host device 106 can, in some examples, include a DPU device, a single board computer (SBC) device, a system-on-chip (SoC) device, and other types of devices. These simple, limited, or integrated device types can lack the firmware requirements to install a management hypervisor 155. These devices can lack Unified Extensible Firmware Interface (UEFI), or can lack a UEFI that includes drivers for host device hardware. A DPU device can include networking accelerator devices, smart network interface cards, or other cards that are installed as a peripheral component to another host device 106.

The management hypervisor 155 can be integrated with the management service 120, which provides device management functionalities. The management hypervisor 155 can communicate with the management service 120 to provide access to the physical memory, physical processors, physical data storage, physical network resources, and physical accelerator resources of the host device 106 for workloads 130. The management hypervisor 155 can also communicate with the management service 120 to provide the host device 106 with access to workloads 130. However, the management hypervisor 155 may not be initially installed to the host device 106.

Virtual devices including virtual machines, containers, and other virtualization components can be used to execute the workloads 130. The workloads 130 can be managed by the management service 120 for an enterprise that employs the management service 120. Some workloads 130 can be initiated and accessed by enterprise users through client devices. The virtualization data 129 can include a record of the virtual devices, as well as the host devices 106 and host devices 106 that are mapped to the virtual devices. The virtualization data 129 can also include a record of the workloads 130 that are executed by the virtual devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the host devices 106 can provide the hardware for the management system 103. While referred to in the singular, the management system 103 can include a plurality of computing devices that are arranged in one or more server banks, computer banks, or other arrangements. The management system 103 can include a grid computing resource or any other distributed computing arrangement. The management system 103 can be multi-tenant, providing virtualization and management of workloads 130 for multiple different enterprises. Alternatively, the management system 103 can be customer or enterprise-specific.

The computing devices of the management system 103 can be located in a single installation or can be distributed among many different geographical locations which can be local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data executed by the host devices 106 and can be accessed using client devices that can be enrolled in association with a user account 126 and related credentials.

The management service 120 can communicate with associated management instructions executed by host devices 106, client devices, edge devices, and IoT devices to ensure that these devices comply with their respective compliance rules 124, whether the specific host device 106 is used for computational or access purposes. If the host devices 106 or client devices fail to comply with the compliance rules 124, the respective management instructions can perform remedial actions including discontinuing access to and processing of workloads 130.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store 123 of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify host devices 106 by one or more device identifiers, a unique device identifier (UDID), a media access control (MAC) address, an internet protocol (IP) address, or another identifier that uniquely identifies a device with respect to other devices.

The device data 122 can include an enrollment status indicating whether a host computing device is enrolled with or managed by the management service 120. For example, an end-user device, an edge device, IoT devices, client devices, and other host device 106 can be designated as "enrolled" and can be permitted to access the enterprise workloads and data hosted by host devices 106, while those designated as "not enrolled," or having no designation, can be denied access to the enterprise resources. The device data 122 can further include indications of the state of IoT devices, edge devices, end user devices, host devices 106, and other devices. While a user account 126 can be associated with a particular person as well as client devices, a device account 128 can be unassociated with any particular person, and can nevertheless be utilized for an IoT device, edge device, or another client device or host device 106 that provides automatic functionalities.

Device data 122 can also include data pertaining to user groups. An administrator can specify one or more of the host devices 106 as belonging to a user group. The user group can refer to a group of user accounts 126, which can include device accounts 128. User groups can be created by an administrator of the management service 120.

Compliance rules 124 can include, for example, configurable criteria that must be satisfied for the host devices 106 and other devices to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules 124 can also be determined based on a user account 126 associated with a user.

Compliance rules 124 can include predefined constraints that must be met in order for the management service 120, or other applications, to permit host devices 106 and other devices access to enterprise data and other functions of the management service 120. The management service 120 can communicate with management instructions on the client device to determine whether states exist on the client device which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices or other vulnerability, as can be appreciated. While the client devices can be discussed as user devices that access or initiate workloads 130 that are executed by the host devices 106, all types of devices discussed herein can also execute virtualization components and provide hardware used to host workloads 130.

The management service 120 can oversee the management and resource scheduling using hardware provided using host devices 106. The management service 120 can oversee the management and resource scheduling of services that are provided to the host devices 106 using remotely located hardware. The management service 120 can transmit various software components, including enterprise workloads, enterprise data, and other enterprise resources for processing and storage using the various host devices 106. The host devices 106 can include a server computer or any other system providing computing capability, including those that compose the management system 103. Host devices 106 can include public, private, hybrid cloud and multi-cloud devices that are operated by third parties with respect to the management service 120. The host devices 106 can be located in a single installation or can be distributed among many different geographical locations which can be local and/or remote from the other components.

The management service 120 can include a scheduling service that monitors resource usage of the host devices 106, and particularly the host devices 106 that execute enterprise workloads 130. The management service 120 can also track resource usage of DPU devices that are installed on the host devices 106. The management service 120 can track the resource usage of DPU devices in association with the host devices 106 to which they are installed. The host device 106 can execute instructions including a host operating system 150, a management component 151 (e.g., in user space) and a management hypervisor 155.

The host operating system 150 can include an operating system that provides a user interface and an environment for applications and other instructions executed by the host device 106. The host operating system 150 can include any operating system. In some examples, the host operating system 150 can include a Linux operating system, a POSIX operating system, a Windows operating system such as Windows Server®, or another operating system.

The management component 151 can communicate with the management service 120 for scheduling of workloads 130 executed using virtual resources that are mapped to the physical resources of one or more host device 106. The management component 151 can communicate with the management hypervisor 155 to deploy virtual devices that perform the workloads 130. In various embodiments, the management component 151 can be separate from, or a component of, the management hypervisor 155. The management component 151 can additionally or alternatively be installed to the host device 106.

The management hypervisor 155 can include a bare metal or type 1 hypervisor that can provide access to the physical memory, physical processors, physical data storage, and physical network resources of the host devices 106 to perform workloads 130. A management hypervisor 155 can create, configure, reconfigure, and remove virtual machines and other virtual devices on a host device 106. The management hypervisor 155 can also relay instructions from the management service 120 to the management hypervisor 155. In other cases, the management service 120 can communicate with the management hypervisor 155 directly. The management hypervisor 155 can identify that a workload 130 or a portion of a workload 130 includes instructions that can be executed using the host device 106.

The SCP 160 can be a separate processor than a main processor of the host device 106. The SCP 160 can be a separate processor that can initialize I/Os, memory, and host main Central Processing Unit (CPU) or main processor cores. In some examples, the SCP 160 has a different architecture from the host main processor. For example, 32-bit ARM and MIPS cores can be used as SCPs for x86 and 64-bit Arm systems; VideoCore cores can be used on ARM-based Raspberry Pies, and so on. The SCP 160 can execute a rich operating system environment itself such as Linux, POSIX, POSIX-like, or another operating system environment. The SCP 160 operating system can be the same as, or different from, the host operating system 150. The SCP 160 in some examples can remote SCP systems such as remote-Direct Memory Access (DMA) devices and systems including PCIeScreamer®, as well as remote hardware debuggers such as remote In-Circuit Emulation (ICE) debuggers. In various implementations, the SCP 160 can include a local or remotely located processor separate from the main processor 204, which includes the capability and access to place data in main processor memory 208.

The management hypervisor first stage bootloader 163 can be considered a portion of the management hypervisor 165 that is executed using the SCP 160 rather than a main processor of the host device 106. The management hypervisor first stage bootloader 163 can be executed as a user space application in an operating system environment executed using the SCP 160 rather than the host main processor. The management hypervisor first stage bootloader 163 can be configured to execute during a boot process or as a startup process of the SCP 160. The management hypervisor first stage bootloader 163 can utilize services provided by the SCP 160 environment, or raw host device 106 access for nonvolatile RAM (NVRAM).

The management hypervisor first stage bootloader 163 can load a kernel of the management hypervisor 165 into main processor memory 208; build and load boot data handoff structures into main processor memory to enable the management hypervisor 165 to use hardware resources of the host device 106; load trusted firmware blob instructions into main processor memory 208; and initialize the host main processor using vendor, manufacturer, or other provider-specific mechanisms and instructions. The management hypervisor first stage bootloader 163 can use vendor-specific mechanisms to write to the main-CPU-visible memory. In some examples, the SCP 160 environment uses the same memory or a limited portion of the main processor memory 208.

The SCP 160 environment can provide the management hypervisor first stage bootloader 163 access to a memory-mapped I/O (MMIO) power-and-reset hardware block on the host device 106 using/dev/mem or a similar path or interface. The SCP 160-resident management hypervisor first stage bootloader 163 can then terminate until the next reset once the host main processor is booted. The booted CPU can begin in EL3, or a firmware or secure monitor privilege level. The management hypervisor 155 can expect Power State Coordination Interface (PSCI) services to be available for booting secondary cores as well as performing power cycle operations like rebooting. PSCI can include a standard interface for power management for supervisory software working at different levels of privilege on an ARM device. A rich operating system of the SCP 160 can provide a PSCI interface to the management hypervisor first stage bootloader 163 for CPU control and overall system power management.

Figure 2:
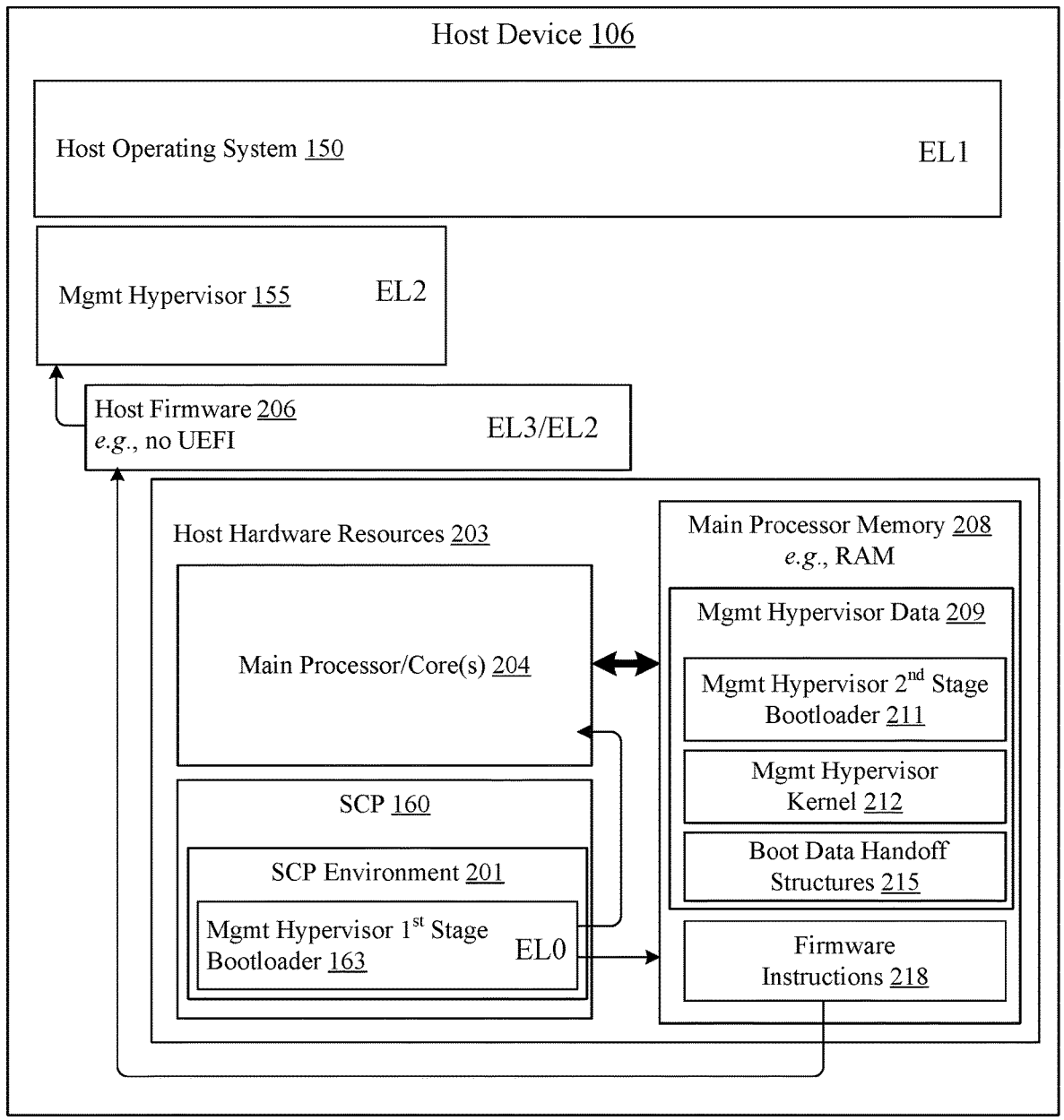
FIG. 2 is a drawing of an example of a host device that loads a management hypervisor from an SCP, according to the present disclosure.

FIG. 2 shows an example of the host device 106 that loads a management hypervisor 155 from user space of an SCP environment 201 executed and provided using the SCP 160. The host device 106 can include host hardware resources 203, host firmware 206, the host operating system 150, and the management hypervisor 155.

The SCP environment 201 can include an operating system environment executed using the SCP 160 rather than the main processors 204. The management hypervisor first stage bootloader 163 can be configured to execute during a boot process or as a startup process of the SCP 160. The SCP environment 201 can provide the management hypervisor first stage bootloader 163 access to a memory-mapped I/O (MMIO) power-and-reset hardware block on the host device 106 using/dev/mem or similar path or interface. The SCP environment 201 can provide a PSCI interface to the management hypervisor first stage bootloader 163 for CPU control and overall system power management.

The host hardware resources 203 can include main processors 204 or main processor cores. The main processor 204 can include multiple processors which can include multiple cores. The main processor 204 can be referred to in the singular for clarity purposes. The main processor 204 can include an ARM processor or another RISC-based processor, a CISC-based processor, or another type of processor. The host hardware resources 203 can also include one or more memory including flash, Non-Volatile Memory Express (NVMe) devices, and other memory devices. The host hardware resources 203 can include specialized ASICs including network interface card (NIC) ASICs, network processing units (NPU) ASICs, field programmable gate array (FPGA) based ASICs, software switches, Programming Protocol-independent Packet Processors (P4) devices, NVIDIA® ConnectX®-6 Dx (CX6) devices, and others.

The host firmware 206 can include Trusted Firmware A (TF-A), Unified Extensible Firmware Interface (UEFI) or another publicly available specification that defines a software interface, Advanced Configuration and Power Interface, a power management specification (ACPI) or another power management firmware, and other firmware for the host device 106. However, as indicated earlier, the host firmware 206 can lack UEFI or can include a UEFI that has insufficient drivers for the host hardware resources 203. This can cause the UEFI to be unable to initialize, load, and execute the management hypervisor 155.

The management hypervisor first stage bootloader 163 can be configured to execute during a boot process or as a startup process of the host device 106. The SCP 160 can be a first processor or processor set to boot during a startup of the host device 106. The SCP 160 can execute the SCP environment 201 as part of the boot or startup process. This SCP environment 201 can include a rich operating system environment. The management hypervisor first stage bootloader 163 can execute in user space of the SCP environment 201. The management hypervisor first stage bootloader 163 can load management hypervisor data 209 and other executable instructions and data into main processor memory 208.

The management hypervisor data 209 can include a management hypervisor second stage bootloader 211, a management hypervisor kernel 212, and boot data handoff structures 215. The boot data handoff structures 215 can include a memory maps for main processor memory 208, memory locations for the management hypervisor kernel 212, as well as descriptions and identifications of host hardware resources 203. In order to build the boot data handoff structures 215, the management hypervisor first stage bootloader 163 can use block, filesystem, network and console I/O as necessary. Alternatively, the boot data handoff structures 215 can be predetermined for the host device 106 and included in, or side loaded for access by, the management hypervisor first stage bootloader 163.

The management hypervisor first stage bootloader 163 can also load the firmware instructions 218 into main processor memory 208. In some examples the firmware instructions 218 can include a BL31 trusted firmware blob and other firmware instructions 218 into main processor memory 208 for execution as host firmware 206. The firmware instructions 218 can use the BL31 blob to load a PSCI implementation. The firmware instructions 218 can then force all or a subset of the main processors 204 to execute the BL31 blob or another set of instructions that can specify the features and security state for the management hypervisor second stage bootloader 211.

The management hypervisor first stage bootloader 163 can run in its own virtual address space. When the management hypervisor first stage bootloader 163 needs to identify memory into which to load a boot module for the management hypervisor 155 or another boot data handoff structure 215, it can use system calls provided using the SCP environment 201. The system calls can include malloc, memalign, mmap, mlock, and other operating system calls. However, the memory and other hardware addresses returned have no meaning outside of the management hypervisor first stage bootloader 163 process. For example, the addresses can be virtual addresses. The management hypervisor first stage bootloader 163 can translate these to physical or machine addresses, and use physical addresses to build the boot data handoff structures 215.

In the example where the SCP environment 201 includes a Linux operating system, the method for translating can include using a /proc/self/pagemap mechanism or another pagemap mechanism to translate addresses, where self refers to a process identifier for the management hypervisor first stage bootloader 163. This interface can include a file in the SCP environment 201 file system in the location that can be specified using /proc/self/pagemap. The memory allocate call or malloc call can be pinned to avoid from getting paged out. Pinned memory can refer to virtual memory pages that are specially marked so that they cannot be paged out based on system API function calls that can pin or prevent paging out of the memory. This can include mlock calls for allocated memory. The management hypervisor first stage bootloader 163 can identify or capture memory data for the boot data handoff structures 215 and management hypervisor kernel 212 by parsing /proc/firmware/memmap, /sys/firmware/memmap, or another interface or file that provides a raw memory map to userspace.

The management hypervisor first stage bootloader 163 can include non-UEFI data identification and definition mechanisms. A device tree can be used verbatim from a user space device tree interface or file such as /proc/devicetree or an ACPI/DeviceTree loaded from file. The device tree can be a data structure and language for identifying and describing hardware. This can be a portion of the boot data handoff structures 215 that includes a description of host hardware that is readable by the management hypervisor 155 so that the management hypervisor kernel 212 doesn't need to hard code machine details of the host device 106. Video framebuffer device information can be initialized using a user space interface or file such as /dev/fb0. The video framebuffer data can also be part of the boot data handoff structures 215.

The management hypervisor second stage bootloader 211 can be a kernel space bootloader. The management hypervisor second stage bootloader 211 can validate the management hypervisor kernel 212, and other boot modules and proceed with launching the management hypervisor 155 using the boot data handoff structures 215 stored in host memory. The host memory can refer to static RAM (SRAM), dynamic RAM (DRAM), synchronous DRAM (SDRAM), and other types of RAM and other memories. The firmware instructions 218 can launch the management hypervisor second stage bootloader 211 with a predetermined set of options as well as provided memory locations of the boot data handoff structures 215. The firmware instructions 218 can be executed at EL3, referring to firmware or secure monitor privilege level.

The management hypervisor 155 can operate in EL2 privilege level. Exception levels (e.g., EL0, EL1, EL2, EL3) can correspond to Advanced RISC Machine (ARM) privilege levels. EL0 can refer to application mode or user space privilege, EL1 can refer to kernel space or rich OS privilege, EL2 can refer to hypervisor privilege, and EL3 can refer to firmware or secure monitor privilege level. The discussion can include reference to exception levels since some host devices 106 can include ARM processors as a main processor. RISC-V privilege levels can include user-mode (U-mode), supervisor mode (S-mode), and machine mode (M-mode). In a RISC-V host device 106 implementation, U-mode can correspond to a user space privilege, S-mode can correspond to kernel, operating system, and/or hypervisor privilege, and machine mode can correspond to firmware or secure monitor privilege. However, other host devices 106 can include other processor types and privilege levels corresponding to other labels and designations such as ring levels of x86 devices.

Figure 3:
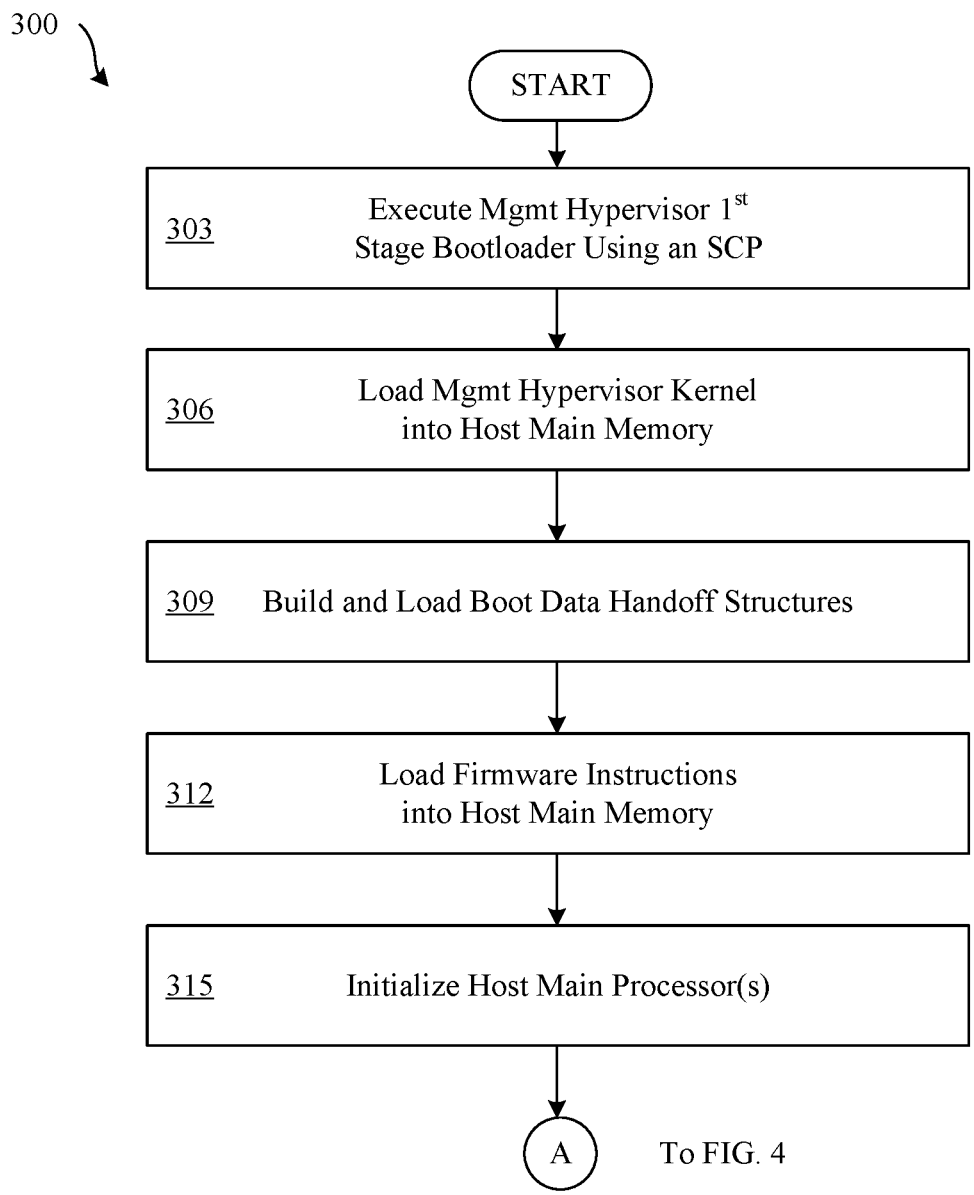
FIG. 3 is a flowchart illustrating functionality implemented by components of the networked environment, according to the present disclosure.

FIG. 3 shows a flowchart 300 that provides an example of the operation of components of the networked environment 100. Generally, this figure provides an example of functionality of a management hypervisor first stage bootloader 163 that loads a management hypervisor 155 from an SCP 160. While a particular step can be discussed as being performed by a particular hardware or software component of the networked environment 100, other components can perform aspects of that step.

In step 303, the host device 106 can execute a management hypervisor first stage bootloader 163. The management hypervisor first stage bootloader 163 can be considered a portion of the management hypervisor 155 that runs from user space of an SCP environment 201 executed by an SCP 160. The management hypervisor first stage bootloader 163 can be configured to execute during a boot process or as a startup process of the host operating system 150.

In step 306, the management hypervisor first stage bootloader 163 can load a management hypervisor second stage bootloader 211 and a management hypervisor kernel 212 into main processor memory 208. The main processor memory 208 areas or address range for the management hypervisor second stage bootloader 211 and the management hypervisor kernel 212 can be pinned using a system call. The management hypervisor first stage bootloader 163 can identify memory into which to load the management hypervisor kernel 212 by system calls to the SCP environment 201 to identify virtual memory addresses. The management hypervisor first stage bootloader 163 can translate the addresses returned by the system call into physical or machine addresses for the management hypervisor kernel 212. Translation can be performed using a pagemap mechanism.

In step 309, the management hypervisor first stage bootloader 163 can build and load boot data handoff structures 215. The management hypervisor first stage bootloader 163 can use block, filesystem, network, console, and I/O facilities and system calls to the SCP environment 201 to build the boot data handoff structures 215. The structures can include modules of the management hypervisor 155, memory maps of the host device 106, and hardware identification and descriptions for host hardware resources 203 of the host device 106.

The management hypervisor first stage bootloader 163 can identify memory into which to load the boot data handoff structures 215 by system calls to the SCP environment 201 to identify virtual memory addresses, and translating these addresses into physical machine addresses. The main processor memory 208 areas or address ranges for the boot data handoff structures 215 can be pinned using a system call.

In step 312, the management hypervisor first stage bootloader 163 can load firmware instructions 218 into memory of the host device 106. The management hypervisor first stage bootloader 163 can identify memory into which to load the firmware instructions 218 by system calls to the SCP environment 201 to identify virtual memory addresses, and translating these addresses into physical machine addresses. The main processor memory 208 areas or address ranges for the firmware instructions 218 can be pinned using a system call. The firmware instructions 218 can include a trusted firmware blob that initializes system security and services including PSCI.

In step 315, the management hypervisor first stage bootloader 163 can initialize one or more of the main processors 204. The management hypervisor first stage bootloader 163 can use manufacturer, vendor, or other provider-specified instructions that initialize a main processor 204. The management hypervisor first stage bootloader 163 can also implement instructions that force the initialized main processor 204 to execute firmware instructions 218, which can include a BL31 or another trusted firmware blob in EL3.

Figure 4:
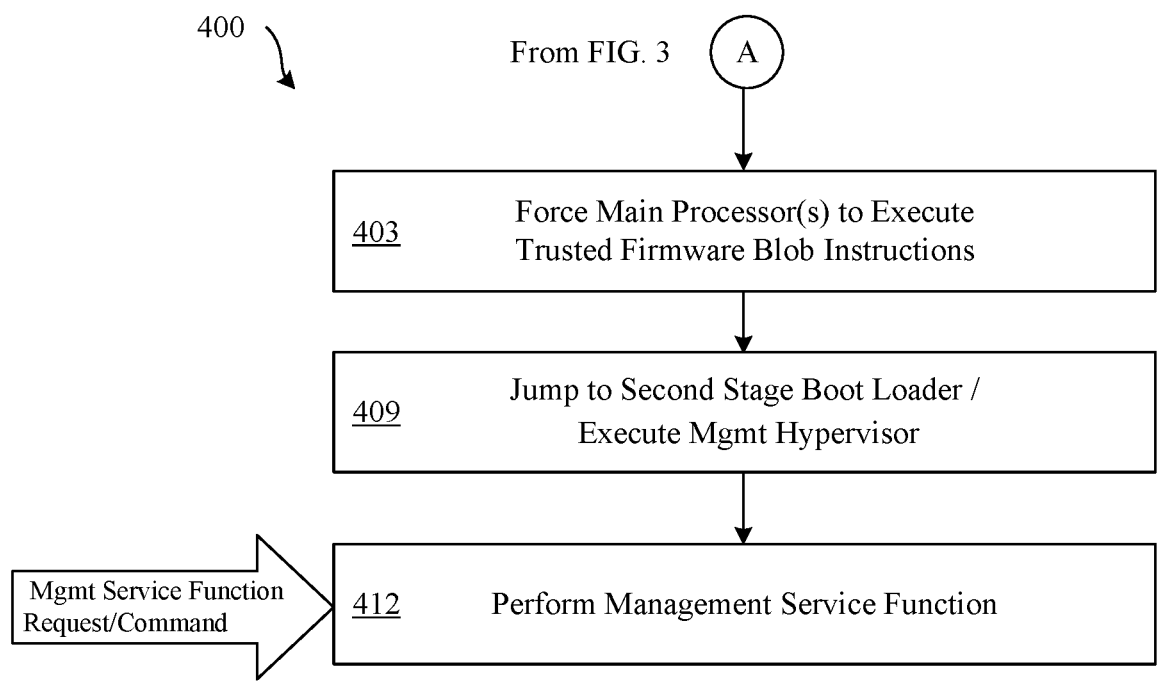
FIG. 4 is a flowchart illustrating additional functionality implemented by components of the networked environment, according to the present disclosure.

FIG. 4 shows a flowchart 400 that provides an example of the operation of components of the networked environment 100. Generally, this figure provides an example of functionality of a firmware instructions 218. The firmware instructions 218 can perform actions that ultimately load and execute a management hypervisor 155. While a particular step can be discussed as being performed by a particular hardware or software component of the networked environment 100, other components can perform aspects of that step.

In step 403, the firmware instructions 218 can be executed. The firmware instructions 218 can be executed by a main processor 204 of the host device 106. The main processor 204 can be forced to execute firmware instructions 218, which can include a BL31 or another trusted firmware blob in EL3. The management hypervisor first stage bootloader 163 can use manufacturer, vendor, or other provider-specified instructions that initialize a main processor 204 to execute a BL31 or another trusted firmware blob in EL3.

In step 409, the host device 106 can jump to the management hypervisor second stage bootloader 211 in EL2. In some examples, the first executable instructions to execute in EL2 after the trusted firmware blob and other firmware instructions 218 can be configured to be the management hypervisor second stage bootloader 211. The management hypervisor first stage bootloader 163 or the firmware instructions 218 can configure the host device 106 boot procedure to invoke, call, or otherwise execute the management hypervisor second stage bootloader 211 along with a pointer to the physical address of the boot data handoff structures 215. As a result, the management hypervisor second stage bootloader 211 can further prepare the host device 106 using the boot data handoff structures 215 and then execute the management hypervisor 155 using the management hypervisor kernel 212.

In step 412, the host device 106 can perform a workload 130 using the host hardware resources 203 or provide the host device 106 with access to a workload 130 executed using a remotely located host device 106. The host device 106 can receive a command to perform a workload 130 through the management hypervisor 155. The host device 106 can perform the workload 130 using host hardware resources 203 that are accessed using the management hypervisor 155. The host device 106 can transmit a request for access to a workload 130, or can receive a command to provide the host device 106 with access to a workload 130. The management hypervisor 155 can provide access to the workload 130 or other management service or enterprise resources such as data stores, applications, and other resources.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or another system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or another system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A non-transitory computer-readable medium comprising instructions executable by at least one processor on a host device to perform operations comprising:
   execute, by a system control processor of the host device, a first stage bootloader that is portion of a management hypervisor and executes in a user space of an execution environment of the system control processor, wherein the system control processor is different from a main processor of the host device;
   load, by the first stage bootloader executing on the system control processor, management hypervisor data and firmware instructions into a main processor memory accessible by the main processor;
   initialize, by the first stage bootloader executing on the system control processor, the main processor using instructions that cause the main processor to first execute the firmware instructions; and
   execute, by the main processor and based at least in part on the firmware instructions, a second stage bootloader that configures and launches the management hypervisor on the main processor using the management hypervisor data.

2. The non-transitory computer-readable medium of claim 1, wherein the system control processor comprises a remote processor that accesses the host device using a network.

3. The non-transitory computer-readable medium of claim 1, wherein the first stage bootloader builds at least one boot data handoff structure in user space based at least in part on files read from a file system of a rich operating system executed using the system control processor.

4. The non-transitory computer-readable medium of claim 1, wherein the firmware instructions comprise a BL3 blob that initializes a Power State Coordination Interface (PSCI) service.

5. The non-transitory computer-readable medium of claim 1, wherein the first stage bootloader uses manufacturer-provided instructions or vendor-provided instructions to initialize the main processor.

6. The non-transitory computer-readable medium of claim 1, wherein the management hypervisor data comprises: a management hypervisor kernel of the management hypervisor, and at least one boot data handoff structure.

7. The non-transitory computer-readable medium of claim 6, wherein the at least one boot data handoff structure comprises: device tree data of the host device.

8. A system, comprising:
   a host device comprising at least one processor; and
   a data store comprising executable instructions, wherein the instructions, when executed by the at least one processor, cause the host device to at least:
     execute, by a system control processor of the host device, a first stage bootloader that is portion of a management hypervisor and executes in a user space of an execution environment of the system control processor, wherein the system control processor is different from a main processor of the host device;
     load, by the first stage bootloader executing on the system control processor, management hypervisor data and firmware instructions into a main processor memory accessible by the main processor;
     initialize, by the first stage bootloader executing on the system control processor, the main processor using instructions that cause the main processor to first execute the firmware instructions; and
     execute, by the main processor and based at least in part on the firmware instructions, a second stage bootloader that configures and launches the management hypervisor on the main processor using the management hypervisor data.

9. The system of claim 8, wherein the system control processor comprises a remote processor that accesses the host device using a network.

10. The system of claim 8, wherein the first stage bootloader builds at least one boot data handoff structure in user space based at least in part on files read from a file system of a rich operating system executed using the system control processor.

11. The system of claim 8, wherein the firmware instructions comprise a BL3 blob that initializes a Power State Coordination Interface (PSCI) service.

12. The system of claim 8, wherein the first stage bootloader uses manufacturer-provided instructions or vendor-provided instructions to initialize the main processor.

13. The system of claim 8, wherein the management hypervisor data comprises: a management hypervisor kernel of the management hypervisor, and at least one boot data handoff structure.

14. The system of claim 13, wherein the at least one boot data handoff structure comprises: device tree data of the host device.

15. A method, comprising:
   executing, by a system control processor of the host device, a first stage bootloader that is portion of a management hypervisor and executes in a user space of an execution environment of the system control processor, wherein the system control processor is different from a main processor of the host device;
   loading, by the first stage bootloader executing on the system control processor, management hypervisor data and firmware instructions into a main processor memory accessible by the main processor;
   initializing, by the first stage bootloader executing on the system control processor, the main processor using instructions that cause the main processor to first execute the firmware instructions; and
   executing, by the main processor and based at least in part on the firmware instructions, a second stage bootloader that configures and launches the management hypervisor on the main processor using the management hypervisor data.

16. The method of claim 15, wherein the system control processor comprises a remote processor that accesses the host device using a network.

17. The method of claim 15, wherein the first stage bootloader builds at least one boot data handoff structure in user space based at least in part on files read from a file system of a rich operating system executed using the system control processor.

18. The method of claim 15, wherein the firmware instructions comprise a BL3 blob that initializes a Power State Coordination Interface (PSCI) service.

19. The method of claim 15, wherein the first stage bootloader uses manufacturer-provided instructions or vendor-provided instructions to initialize the main processor.

20. The method of claim 15, wherein the management hypervisor data comprises: a management hypervisor kernel of the management hypervisor, and at least one boot data handoff structure.

* * * * *